US009810096B2

(12) United States Patent
Evans et al.

(10) Patent No.: US 9,810,096 B2
(45) Date of Patent: Nov. 7, 2017

(54) TURBOMACHINE FAN CASING ASSEMBLY

(71) Applicant: ROLLS-ROYCE PLC, London (GB)

(72) Inventors: Dale Edward Evans, Derby (GB); David Laker Christmas, Bristol (GB)

(73) Assignee: ROLLS-ROYCE plc, London (GB)

( * ) Notice: Subject to any disclaimer, the term of this patent is extended or adjusted under 35 U.S.C. 154(b) by 305 days.

(21) Appl. No.: 14/657,601

(22) Filed: Mar. 13, 2015

(65) Prior Publication Data
US 2015/0275695 A1  Oct. 1, 2015

(30) Foreign Application Priority Data

Mar. 26, 2014 (GB) .................................. 1405388.8

(51) Int. Cl.
| | |
|---|---|
| *F01D 25/26* | (2006.01) |
| *F02K 3/06* | (2006.01) |
| *F01D 25/24* | (2006.01) |
| *F01D 25/28* | (2006.01) |
| *F01D 21/04* | (2006.01) |

(52) U.S. Cl.
CPC ........... *F01D 25/26* (2013.01); *F01D 25/243* (2013.01); *F01D 25/28* (2013.01); *F02K 3/06* (2013.01); *F01D 21/045* (2013.01); *F05D 2220/32* (2013.01); *F05D 2220/36* (2013.01);
(Continued)

(58) Field of Classification Search
CPC ...... F01D 25/24; F01D 25/243; F01D 25/164; F01D 25/28; F01D 25/26; F02K 3/06
See application file for complete search history.

(56) References Cited

U.S. PATENT DOCUMENTS

| | | | |
|---|---|---|---|
| 2011/0038731 A1* | 2/2011 | Evans | ....................... F01D 5/06 416/220 R |
| 2012/0224949 A1* | 9/2012 | Harper | .................. F01D 21/045 415/9 |
| 2013/0189095 A1 | 7/2013 | Harper et al. | |

FOREIGN PATENT DOCUMENTS

| | | |
|---|---|---|
| EP | 2290199 A2 | 3/2011 |
| EP | 2305985 A2 | 4/2011 |

(Continued)

OTHER PUBLICATIONS

Oct. 1, 2015 Extended Search Report issued in European Patent Application No. 15159004.9.
(Continued)

*Primary Examiner* — Craig Kim
*Assistant Examiner* — Maxine Adjagbe
(74) *Attorney, Agent, or Firm* — Oliff PLC

(57) ABSTRACT

A turbomachine casing assembly including an inner casing element for arrangement radially outward of a turbomachine fan; an outer casing element for arrangement radially further outward of the turbomachine fan; a retaining lip arranged radially inward of a portion of the inner casing element; and a separator extending between the inner and outer casing elements and arranged to urge a portion of the inner casing element against the lip. The separator is arranged in compression between the inner and outer casing elements to urge the portion of the inner casing element against the lip. The separator is arranged to engage a frangible region of the inner casing element such that the frangible region is configured to break in response to an impact satisfying predetermined conditions, allowing the inner casing element to displace radially outwards exposing features to improve retention of a released fan blade.

20 Claims, 7 Drawing Sheets

(52) U.S. Cl.
CPC ...... *F05D 2230/51* (2013.01); *F05D 2230/60* (2013.01); *F05D 2260/311* (2013.01)

(56) References Cited

FOREIGN PATENT DOCUMENTS

| | | |
|---|---|---|
| EP | 2600008 A1 | 6/2013 |
| EP | 2 620 652 A1 | 7/2013 |
| EP | 2 620 653 A1 | 7/2013 |

OTHER PUBLICATIONS

Oct. 30, 2014 Search Report issued in British Application No. GB1405388.8.

\* cited by examiner

TURBOMACHINE FAN CASING ASSEMBLY

FIELD OF THE INVENTION

The present invention relates to a turbomachine casing assembly and particularly, but not exclusively, to a casing assembly for the fan of a turbofan gas turbine engine.

BACKGROUND

With reference to FIG. 1, a ducted fan gas turbine engine that can incorporate the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Thus it can be said that turbofan gas turbine engines for powering aircraft generally comprise inter alia a core engine, which drives the fan 12. The fan 12 comprises a number of radially extending fan blades 12' mounted on a fan rotor which is enclosed by a generally cylindrical fan casing.

To satisfy regulatory requirements, such engines are required to demonstrate that if part or all of a fan blade 12' were to become detached from the remainder of the fan during use (i.e. during rapid rotation of the fan), that the detached part(s) are suitably captured within the engine containment system. Detachment of part of all of a fan blade 12' in such circumstances is known in the art as a fan blade-off event.

It is known to provide the fan casing with a fan track liner which together incorporate a containment system, designed to contain any released blades parts thereof or associated debris.

FIG. 2 shows a partial cross-section of such a casing and fan track liner, representative of the region indicated by reference numeral 1 in FIG. 1.

In the event of a "fan blade-off" (FBO) event, the detached fan blade 12' travels radially outward from the fan, and forwards of the fan (i.e. upstream relative to the gas entering the fan). For brevity, hereafter we will refer to a "blade" in the context of a fan blade-off event, but it is to be noted that reference to a "blade" includes not only a detached entire blade, but also a part or fragment thereof, and may also refer to any other significant debris that might be generated by the blade-off event.

The detached blade impacts the fan track liner shown in e.g. FIG. 2 which includes an attrition liner 30, septum 32 and honeycomb layer 34. For example, the blade penetrates the attrition liner 30. It may also penetrate the septum 32 and aluminium honeycomb layer 34 before engaging the hook 36. The fan track liner must therefore be relatively weak in order that any released blade can pass through it essentially unimpeded and subsequently be trapped by the fan casing.

A particular prior art turbomachine casing assembly is shown in FIG. 3. The features described above for FIG. 2 are labelled with the same reference numerals for brevity. As can be seen, in this arrangement, the honeycomb layer 34, for example formed of aluminium, is provided in a tray 38 to be sandwiched between the tray 38 and the septum 32.

Importantly, it can be seen that the septum (and in the particular configuration shown in FIG. 3, the tray 38) are bolted to a lip 40 provided by the hook 36. The bolt and nut assembly 42 is arranged to pinch together the septum 32 (and possibly tray 38) and lip 40. The bolt 43 in the assembly 42 is under tension.

In a fan blade-off event, although the blade will be successfully caught by the arrangement shown in FIG. 3, the action of the detached blade on the fan track liner urges the fan track liner to displace radially outwards. Accordingly, the hook 36 and/or the lip 40 is typically seriously damaged by transferal of the energy of the detached blade from the fan track liner to the hook 36 and/or lip 40 via the bolt 43 due to the presence of holes in the lip.

Such damage may include for example cracking or breaking of the hook 36 and/or lip 40. It may also include for example deformation of the hook 36 or lip 40. Loss of casing integrity in this way is unacceptable in many turbomachines, in particular in gas turbine engines used on aircraft for example. Thus, damage of this sort necessitates repair of the turbomachine, for example by replacing the casing housing the fan blade, and providing the hook 36. This is because of concerns that damage to the hook 36 and/or lip 40 may propagate through the fence and into the casing barrel itself which undermines the integrity of the whole assembly.

Accordingly the present disclosure aims to provide a turbomachine casing assembly, e.g. for a gas turbine engine, that will substantially overcome the problems associated with the prior art assemblies.

SUMMARY OF THE DISCLOSURE

Accordingly, in an aspect, there is provided a turbomachine casing assembly including an inner casing element for arrangement radially outward of a turbomachine fan; an outer casing element for arrangement radially further outward of the turbomachine fan; a retaining lip arranged radially inward of at least a region of the inner casing element; a separator extending between the inner and outer casing elements and arranged to urge a portion of the inner casing element against the lip; wherein the separator is arranged to engage a frangible region of the inner casing element such that the frangible region is configured to break in preference to the separator; thereby, allowing the inner casing element to displace radially outwards in response to an impact satisfying predetermined conditions, and thus preferably exposing features which improve retention of a released fan blade.

The separator may be arranged in compression between the inner and outer casing elements to urge the portion of the inner casing element against the lip.

At least a portion of the frangible region may be axially offset relative to the lip, with respect to the axis of the casing assembly (and/or the rotational axis of the turbomachine). In other words the at least a portion of the frangible region may be located downstream of the lip, with respect to the (intended) direction of flow of fluid, e.g. gas, through the turbomachine casing assembly when in use.

The separator may engage the frangible region at a position which is axially offset relative to the lip, with respect to the axis of the casing assembly (and/or the rotational axis of the turbomachine). In other words the separator may engage the frangible region at a position which is located downstream of the lip, with respect to the (intended) direction of flow of fluid, e.g. gas, through the turbomachine casing assembly when in use.

Thus, in response to an impact of suitable force (energy) to displace the inner casing element radially outward toward the outer casing element, the retaining lip is not damaged, because the inner casing element and the lip are not coupled. Nevertheless, the separator acts to maintain the lip and inner casing element in suitable aerodynamic abutting engagement.

The separator may be arranged to engage the frangible region of the inner casing element such that the frangible region is configured to break in response to an impact satisfying predetermined conditions. Thus, the assembly is arranged to respond to said impact by permitting the inner casing element to move radially outward toward the outer casing element—for example, to expose a fence member for receiving the body causing the impact.

The predetermined conditions may include a threshold outward radial force, i.e. a component of an impact force in the outward radial direction.

Breaking the frangible region allows the inner casing element to disengage from the lip and move towards the outer casing element. The separator is arranged to pass through the broken frangible region as the inner casing element moves towards the outer casing element. Thus, the separator may effectively punch a hole in the inner casing element to allow relative (radial) movement of the inner casing element and outer casing element.

The impact may be the result of a blade-off event, in which a blade or portion thereof of the fan is detached therefrom and impacts the inner casing element. In response to a blade-off event, the separator may be arranged to break the frangible region to allow the inner casing element to disengage from the lip and to move towards the outer casing element.

The separator may include a separating leg arranged to extend between the inner and outer casing elements. It may include a clamping sub-assembly arranged to couple the separating leg to the frangible region of the inner casing element.

The separator is arranged to be capable of varying the extent to which the inner casing element is urged against the lip.

For example, the clamping sub-assembly includes a sleeve. The sleeve may line a hole provided in the inner casing element. The sleeve defines a passageway through the inner casing element. The separating leg extends at least partway along the passageway and is adapted for complementary locking engagement with the sleeve. The extent to which the separator urges the inner case element against the lip may be variable by relative movement of the separating leg and sub-assembly.

The inner surface of the sleeve, at least partially defining the passageway, may be threaded for complementary engagement with a threaded surface of the separating leg.

The clamping sub-assembly may be arranged to clamp, between mutually opposing (in the radial direction, relative to the axis of the casing assembly) flange elements, at least a portion of the first casing element 102.

The radially innermost flange (relative to the axis of the casing assembly) may be a collar provided integrally with the sleeve. The radially outermost flange (relative to the axis of the casing assembly) may be a body movable along the outer surface of the sleeve, adapted for complementary locking engagement with the sleeve to be capable of clamping a region of the inner casing element between itself and the radially innermost flange. For example, the radially outermost flange may be a threaded nut for complementary engagement with a threaded outer surface of the sleeve.

To facilitate breaking of the frangible region, the clamping sub-assembly may include a breaking member, adapted to cause the breaking of the frangible region in response to said impact. For example, this may be provided in the form of a sharp ridge lip provided on the nut periphery and arranged to cut or punch a hole in the inner casing element.

Additionally, or alternatively, the frangible region of the inner casing element may be configured to be structurally weaker than a surrounding region of the inner casing element to facilitate breaking of the frangible region in response to said impact.

The first casing element may be a fan track liner panel. The clamping sub-assembly may be arranged to clamp only the septum of the panel. The clamping sub-assembly may alternatively be arranged to clamp a portion of a tray liner holding a honeycomb structure and the septum of the panel.

In an aspect, there is provided a gas turbine engine incorporating a casing assembly as described herein according to any aspect or embodiment.

In an aspect, there is provided a method of assembling a turbomachine casing assembly as described herein according to any aspect or embodiment, the method including the step of arranging the separator to extend between the inner and outer casing elements to urge a portion of the inner casing element against the lip.

The method may include the step of compressively arranging the separator between the inner and outer casing elements to urge the portion of the inner casing element against the lip.

The method may be a method of assembling a gas turbine engine incorporating a turbomachine casing assembly as described herein according to any aspect or embodiment.

Any feature disclosed herein may be incorporated into any aspect or embodiment described herein unless the incorporation is expressly stated to be undesirable, or it is understood by a skilled person to be technically impossible.

BRIEF DESCRIPTION OF THE DRAWINGS

Embodiments of the invention will now be described by way of example with reference to the accompanying drawings in which.

DETAILED DESCRIPTION

Figure 4:
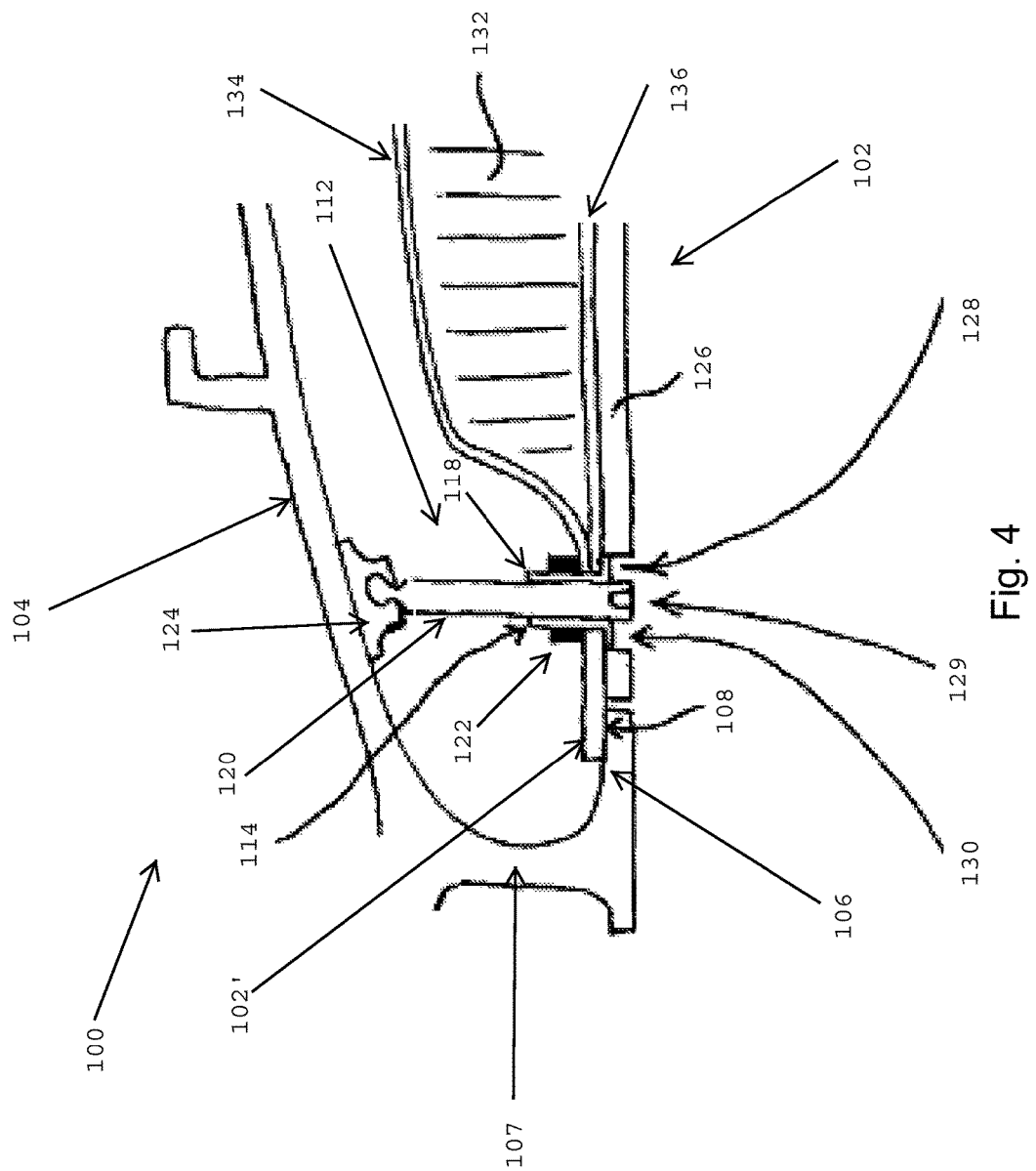
FIG. 4 shows a partial cross-section of a fan casing assembly.

An example is shown in FIG. 4 which shows a partial cross-section of a casing assembly 100 suitable for a fan of a gas turbine engine (not shown) having a principal axis of rotation about which the fan rotates.

The assembly 100 includes a first casing element 102 for arrangement radially outward of the fan (not shown). The first casing element 102 is typically one of a series of first casing elements arranged circumferentially around the (axis of the) fan. Each first casing element 102 may interlock with its nearest neighbours to provide a continuous (generally circumferential) track proximate to the tips of the blades of the fan.

Each first casing element 102 may be referred to as a fan track liner panel.

The assembly 100 also includes an outer casing (element) 104. The outer casing (element) may be referred to as the casing barrel, or containment casing barrel.

The outer casing 104 is arranged generally circumferentially around the series of inner casing elements 102. In other words, the series of first casing elements 102 may be arranged radially outward of the fan, and the outer casing 104 may be arranged to be radially further outward of the fan than the series of first casing elements 102.

The series of first casing elements 102 and the outer casing 104 may be coaxially aligned to define the principal axis of the casing assembly 100. The axis of the casing assembly 100 may be generally coaxially aligned with the axis of rotation of the fan.

An annular void is typically defined between the first casing elements 102 and the outer casing 104 which extends axially along the casing assembly 100. The void may contain other desirable elements useful in the operation of the turbomachine, for example vibration dampening or acoustic dampening elements and electronic components etc.

A retaining element, or lip, 106 is provided for each first casing element 102 at a forward region (defined relative to the intended location of the fan) of the respective first casing element 102. The lip 106 may be formed as a single continuous lip provided for each of the respective first casing elements in the series, and thus may extend generally circumferentially around the axis of the casing assembly 100.

Lip 106 may be formed at an end region of hook or fence element 107, arranged to be capable of retaining a blade in a blade-off event. Hook 107 is therefore preferably arranged to be axially forward of the first casing elements 102, and the fan (when in use).

Hook 107 may be formed as a radially inward extension of outer casing 104.

For clarity of explanation, the discussion will now focus primarily on a single first casing element 102, but the discussion is of course applicable to each casing element 102 in the series.

A rearward region of the first casing element 102 is coupled to e.g. the outer casing 104 to prevent significant axial and radial movement of the first casing element 102 relative to the outer casing 104.

A forward extension 102' of the first casing element 102 overlaps generally in the axial direction with (a rearward extension of) the lip 106. A face of the forward extension 102' having a radially inward facing component is abuttable against a face of the lip 106 having a radially outward facing component at interface 108. Thus, abutting engagement of the forward extension 102' and the lip 106 prevents the casing element 102 from being further displaced radially inwards, towards the axis of the casing assembly 100; i.e. beyond the relative position defined by the lip 106.

Figure 1:
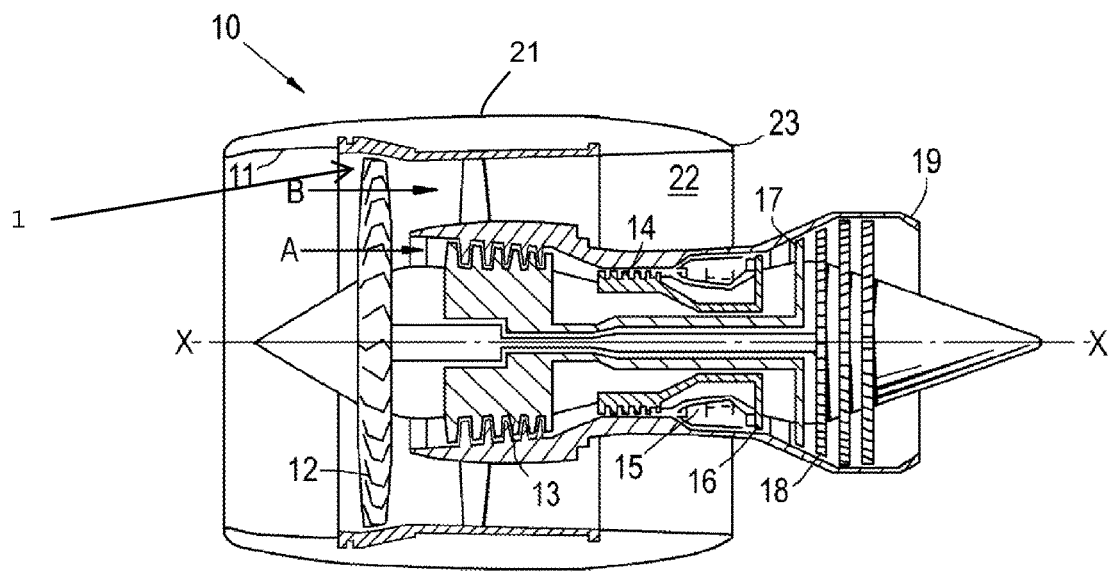
FIG. 1 shows a cross-section of a schematic representation of a gas turbine engine.
Figure 2:
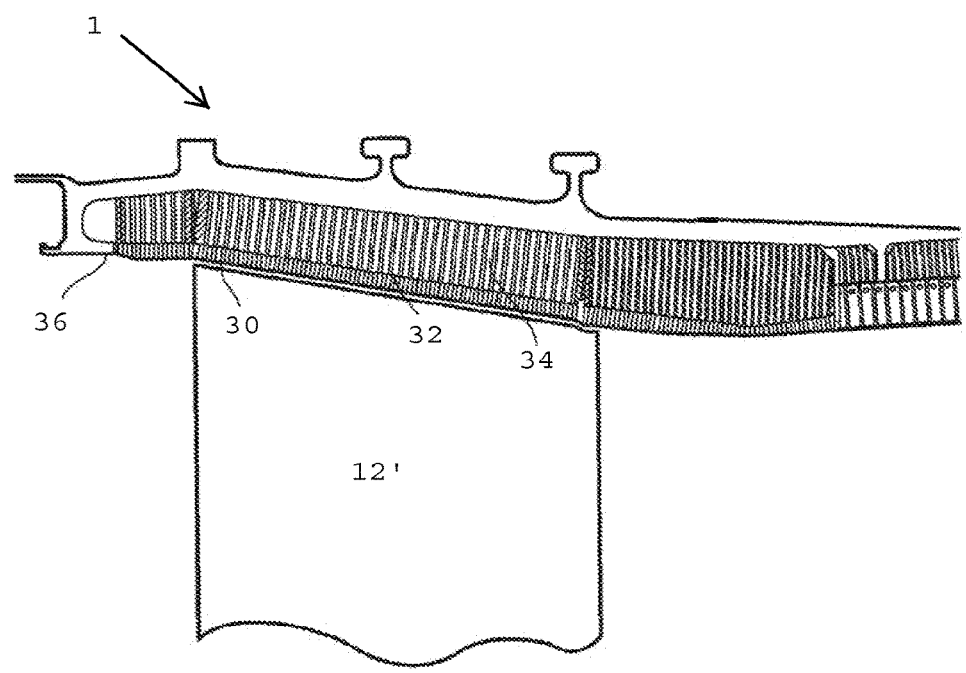
FIG. 2 shows a partial cross-section of a fan casing assembly of related art.
Figure 3:
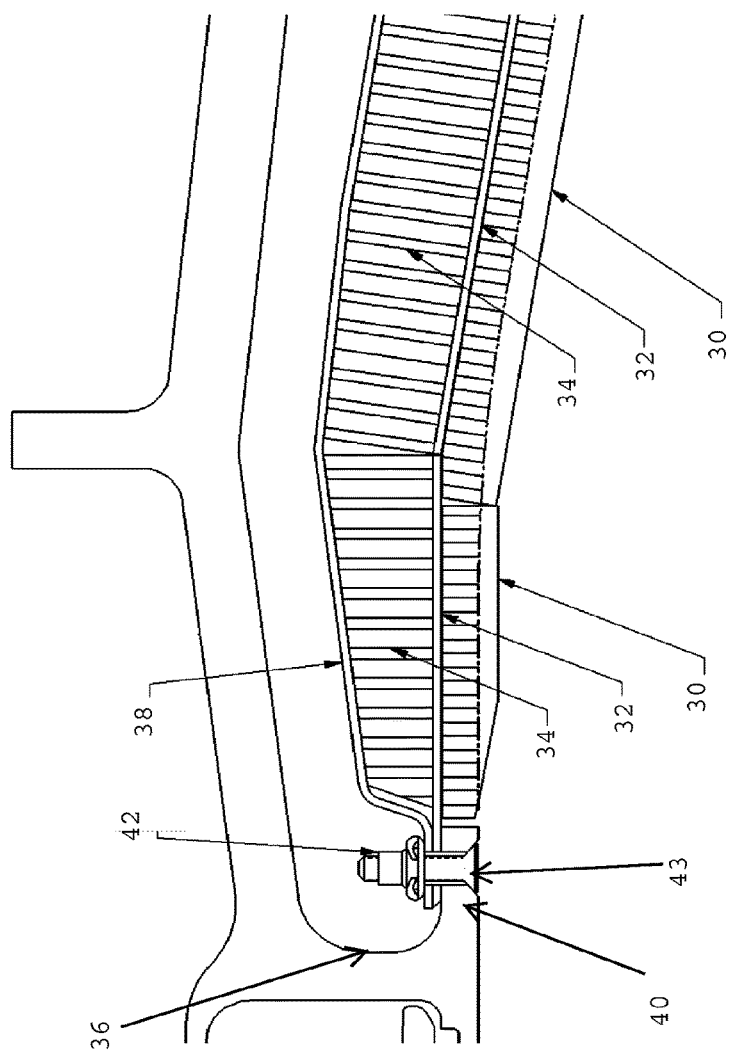
FIG. 3 shows another partial cross-section of a fan casing assembly of related art.

Forward extension 102' and the lip 106 are not bolted together as shown in the prior art example provided in FIG. 3. In other words a retaining or coupling element is not provided under tension to pinch together the forward extension 102' and lip 106.

Instead, a separator 112 is provided extending between the first casing element 102 and outer casing 104 to urge forward extension 102' and lip 106 into abutting engagement to form interface 108. Separator 112 is arranged to be under compression.

In the preferred embodiment shown in FIG. 4, the separator is provided as a separating assembly. The assembly includes a two-part threaded collar sub-assembly 114. Sub-assembly 114 includes a first collared sleeve element 118, arranged in a hole formed through the first casing element 102. The hole may be referred to as a lumen or a bore. Collared sleeve element 118 may extend beyond the first casing element, to stand proud in the void. Collared sleeve element 118 is provided with a collar or flange, extending generally radially outward, with respect to the long axis of the element 118, to engage with a face of the first casing element 102 and seat the element 118 within the hole. The external surface of the collared sleeve element 118 may be threaded. Thus, a complementary threaded nut 122 can be wound along the threaded element 118, to clamp a portion of the first casing element 102 between the collar, or flange, of element 118 and the nut itself.

The collared sleeve element 118 is arranged to convey separating leg 120 through the hole into the void. The inner surface of element 118 may therefore be threaded, and the outer surface of the separating leg 120 may be formed to include a complementary thread. Thus, the separating leg can be conveyed through the collared sleeve element 118 by rotation of the separating leg 120.

Separating leg 120 is progressively extendable between the first casing element 102 and the out casing 104 to urge them apart. By extending the separating leg 120 sufficiently, forward extension 102' and lip 106 can be brought into abutting engagement at interface 108. By extending the separating leg suitably, the pressure at interface 108 can be controlled to provide a suitable seal, if desired. For example, in embodiments where the element 118 and separating leg 120 are cooperatively threaded, the application of suitable torque to the separating leg 120 can achieve the desired results.

A variety of shapes for the head 129 of the separating leg 120 could be provided, for example torque could be applied by a slot-head, a Phillips-type head, a hexagonal alien key type head, a square recess or projection, a star shaped recess or projection, etc. It is simply necessary that the suitable level of torque can be applied without deforming or burring of the head 129 of the separating leg 120.

Sub-assembly 114 may provide a threaded hole, bore or lumen, to convey the separating leg into the void.

Sub-assembly 114 effectively clamps a portion or region of the first casing assembly 102. The edge of the upper annular clamp face (in the example above, the nut) may incorporate a "fail here" feature configured to generate the fail during a blade-off event. For example, a cutting edge may be provided on the periphery of the clamp face which engages the first casing element 102.

The region of the first casing element which is engaged by the separator 112 is configured to be frangible, or breakable, under predetermined conditions. In particular, the frangible region is configured to break in preference to the separator 112 in response to an impact satisfying predetermined conditions, for example a fan blade-off event. Preferably, the separator 112 does not break in response to such an impact. For ease of reference this region will be referred to as the frangible region. For example, when the first casing element 102 is impacted with a predetermined level of force, for example generally in the radial direction with respect to the axis of the casing assembly 100, the frangible region is configured to break; for example, to allow radial displacement of the first casing element 102 relative towards the outer casing 104. For example, in a fan blade-off event, impact of the blade on the first casing element will preferably cause the frangible region to break and allow the first casing element 102 to move radially towards the outer casing 104. Thus, the lip 106 and/or hook 107 are not damaged by the energy imparted to the first casing element 102 by the blade in a blade-off event.

As explained above, this breaking may be a consequence of a feature provided by the separator, in particular the sub-assembly 114, or a consequence of a feature provided by the first casing element 102 itself. Nevertheless, the interaction of the separator 112 and the first casing element 102 during a predetermined event (for example a fan blade-off event) results in the frangible region breaking and allowing radial displacement of the first casing element 102 (radially outward) towards the outer casing 104.

It is important to retain the overlap between forward extension 102' and lip 106 to prevent the first casing element from moving too far radially inwards, after initially being moved radially outwards in a blade-off event for example. Thus, it is preferred that the separator merely punches a hole in the frangible region, and does not cause the forward extension 102' to be sheared off. Thus, it is preferred that the frangible region with which the separator engages is a region of the first casing element 102 which is configured to be weakened relative to the surrounding region of the first casing element 102, to encourage localized breaking but to discourage an extended fracture occurring—in particular, to discourage an extended fracture which may lead to at least a portion of the forward extension 102' from being removed from the first casing element 102. For example, a generally circular region around the separator may be so weakened.

Alternatively, the separator may be shaped or arranged to encourage a localized fracturing of the first casing element 102, and to discourage the type of extended fracture discussed above.

A foot may be provided as an intermediary between the separating leg 120 and the outer casing 104. In a preferred embodiment, the foot 124 is attached to the separating leg 120 by a universal joint, e.g. a ball and socket joint. However, in this or any other embodiment including a foot (for example see FIG. 5 discussed below), the foot may be rotatable generally about one axis, for example about the long axis of the separating leg 120. The foot may be rotatable about another axis, for example about an axis perpendicular to the long axis of the leg 120.

In alternative embodiments, the foot may be a pad bonded to the internal surface of the outer casing 104, and arranged to provide a surface for engagement with the radially outer end of the separating leg 120. A foot 138 provided in the form of such a bonded pad may include a recess arranged to receive the end of the separating leg. Here, internal surface of the outer casing 104 means the surface of the outer casing 104 which faces generally inwards towards to the axis of the casing assembly (typically aligned with the rotational axis of the fan).

The separating leg 120 may be able to be rotated relative to the foot 138 when they are engaged and urging the forward extension 102' and lip 106 into abutting engagement.

The foot may be formed of a material which is softer than the outer casing. For example, the foot may be formed of nylon.

Each first casing element 102, may be provided with an abradable attrition liner facing the tips of the fan in situ. During operation of the turbomachine, the fan blades cut a path into the abradable layer creating a seal against the attrition liner and this minimising air leakage around the blade tips. In the embodiment shown in FIG. 4, the separating leg 120 sits in a recess 128 formed in the attrition liner. The recess 128 is typically filed with filler 130. Such filler is known.

The frangible region is configured such that in normal operation of the turbomachine, the forces imparted by the fan blades rubbing against the attrition liner 126 are insufficient to cause breakage of the frangible region.

The first casing element 102 may be provided with a honeycomb layer 132, for example arranged to be disposed between a tray 134 and the septum 136 of the first casing element 102.

In the embodiment shown in FIG. 4, the sub-assembly 114 clamps both the septum 136 and the tray 134.

Figure 5:
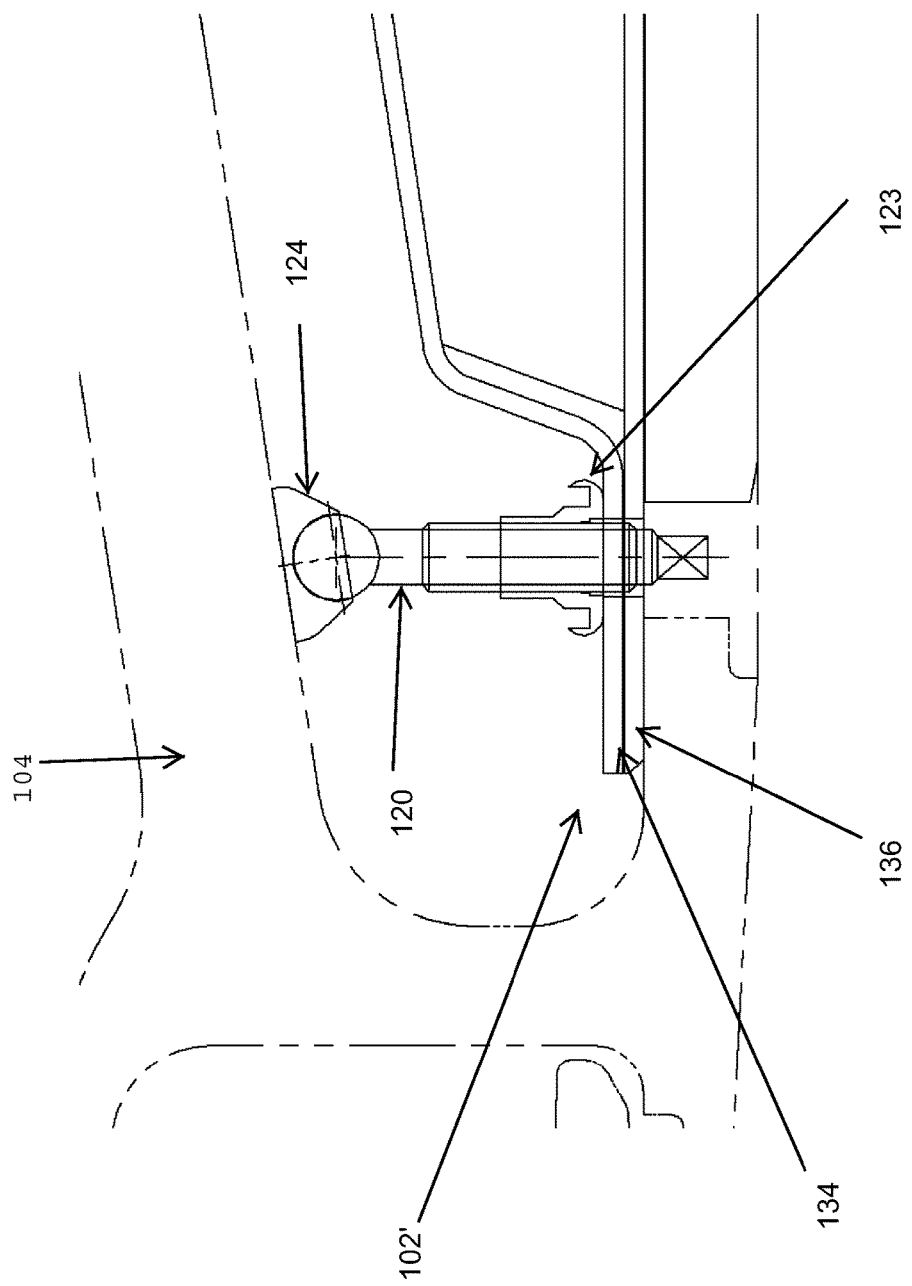
FIG. 5 shows an alternative partial cross-section of a fan casing assembly.

This is shown in closeup in FIG. 5, which shows an alternative embodiment to that of FIG. 4. In the embodiment of FIG. 5, a basket nut 123 is rigidly fixed to the first casing element 102. For example, it may be riveted or welded to the first casing element 102. In particular it may be rigidly fixed to the tray 134, or to the septum 136 as discussed below. The basket nut 123 replaces the element 118 and nut 122 shown in FIG. 4 for example. The basket nut 123 may be provided with an oval shoulder to provide a locking feature. To facilitate breaking of the frangible region of the first casing element 102, the basket nut may include a breaking member, adapted to cause the breaking of the frangible region in response to e.g. a fan blade-off event. For example, this may be provided in the form of a sharp ridge lip provided on the basket nut periphery and arranged to cut or punch a hole in the first casing element 102.

Figure 6:
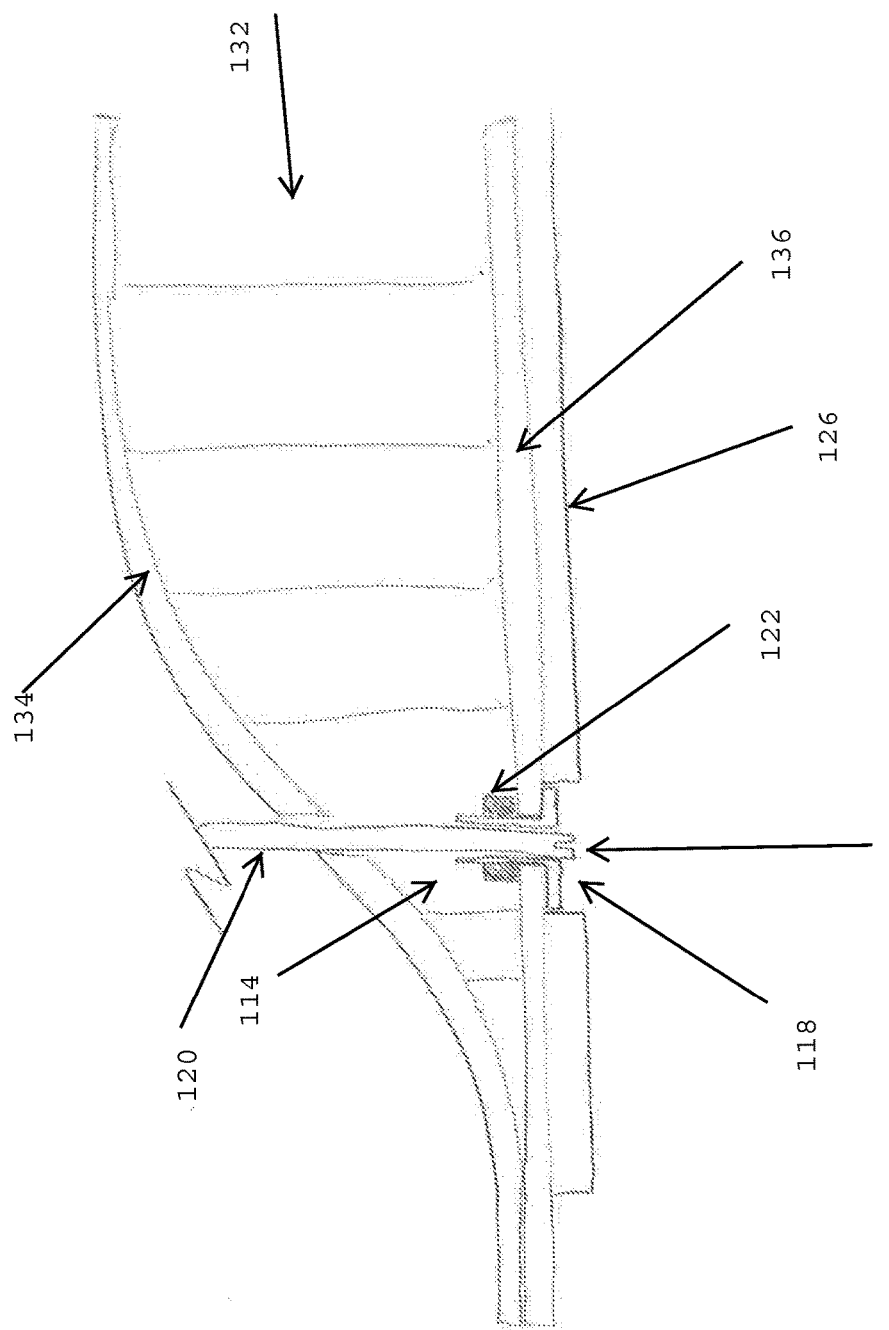
FIG. 6 shows yet a further alternative partial cross-section of a fan casing assembly.

In alternative embodiments to those discussed above the sub-assembly 114 may clamp only the septum 136 so as to reduce any adverse effect such an arrangement may have on the vibration response of the fan track liner 102 as a whole. However, the sandwich construction defined by 134, 136 (and possibly 132) may extend axially further forward of the separating leg (e.g. to form forward extension 2012') to help stiffen the inner casing element 102, especially to help stiffen forward extension 102' by virtue of providing such a sandwich arrangement. Thus, the separating leg 120 may extend between the first casing element 102 and the outer casing 104 by extending through an aperture formed in the tray 134 and the honeycomb layer 132. This arrangement is shown in FIG. 6 by way of example. In the example shown the outer casing 104, lip 106 etc. are not shown.

In a method of assembling the turbomachine casing assembly, a first casing element 102 may initially be detached from the assembly. The separating leg 120 may be screwed in to the sub-assembly 114, for example from what will become the internal side of the element 118 relative to the region between the first casing element 102 and the outer casing 104). In other words it may initially be screwed into what will become the generally radially outward facing aspect (relative to the axis of the casing assembly) of the first casing element 102 as configured in the engine. This may be necessary if the separator includes a foot attachment, for example. In the embodiment shown, element 118 and nut 122 are pre-assembled onto first casing element 102 before leg 120 is introduced.

The first casing element 102 may then be fitted to the rest of the assembly 100, for example by sliding the forward extension 102' over the lip 106 to form interface 108 and by coupling a rearward region of the element 102 e.g. to the outer casing 104.

The separating leg 120 may then be progressively moved toward the outer casing, for example by rotating it by the application of the torque. Progressive application of torque will eventually mean that the separating leg 120 urges the outer casing 104 and the first casing element 102 apart and, importantly, urges forward extension 102' to abut against lip 106 with increasing force.

When a predetermined level of torque is applied, it can be determined that the force at interface 108 is sufficient, for example to provide a suitably aerodynamically flush arrangement.

In the embodiments where the separating leg 120 is arranged to engage a pad bonded to the outer casing 104, the separating leg 120 may be inserted to the sub-assembly 114 from the external side (i.e. the radially inwardly facing aspect of the first casing element 102 when in situ in the engine)of the first casing element 102, i.e. from the radially outer face of the element 102. Thus, the separator may be suitable arranged with the first casing elements 102 in situ in the assembly 100.

Figure 7:
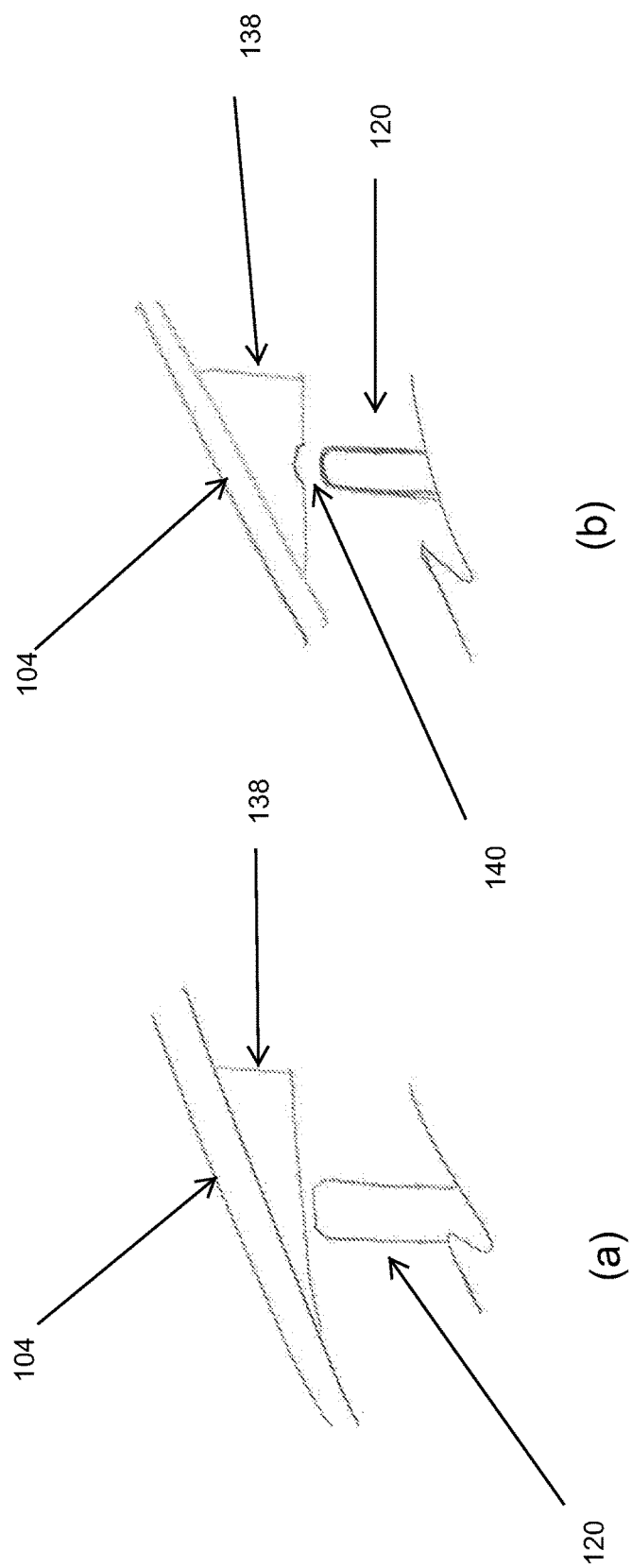
FIG. 7 shows an example of pads bonded to the outer casing (element).

FIG. 7 shows two preferred arrangements of bonded pad 138. In FIG. 7(a), a first arrangement is shown in which bonded pad 138 is arranged on the inner surface of outer casing 104 to provide a surface which is generally parallel to the axis of the casing assembly 100. This arrangement is advantageous, because the outer casing 104 generally presents a conical inner surface, and thus this arrangement avoids side loading on the leg 120 and clamping assembly 114.

FIG. 7(b) shows a similar arrangement, further provided with a dimple 140, for receiving an end of the separating leg 120. The end of the separating leg 120 can be seated in the dimple to help prevent unwanted axial or radial translation of the separating leg 120 across the surface of the bonded pad 138.

Each bonded pad 138 provides protection for the outer casing 104, and helps to prevent damage to the outer casing 104 from the separating leg 120. For example, in the event of a blade-off event, the bonded pad 138 can provide a cushioning effect, absorbing some of the energy conveyed along the separating leg as the first casing elements 102 is struck by the blade. Furthermore, it provides some additional protection for the casing inner surface against damage which may be caused in normal operation and which might later undermine the casing integrity.

During a fan blade-off event the first casing element 102 acts as a trapdoor and is displaced radially outward toward the outer casing by the separator 112 puncturing the frangible region of the first casing element 102. This movement exposes the hook or fence 107 to receive the blade released during the fan blade-off event.

The first inner casing element may be a fan track liner panel. The generally circumferential series of first inner casing elements may be a series of fan track liner panels arranged to provide a fan track liner. The outer casing 104 may be an outer casing of a containment casing assembly, for arrangement around the fan of a turbomachine such as a gas turbine engine.

Separator 112 may be referred to as a jackscrew assembly extending between the first casing element 102 and the outer casing 104, and arranged to urge the forward extension 102' and the lip 106 into abutting engagement; wherein in response to a fan blade-off event in which a blade impacts the first casing element 102, the separator 112 is configured to cause a frangible region of the first casing element to break to permit the first casing element 102 to move radially outward toward the outer casing 104.

In some respects, the clamped/jacked portion of the fan track liner panel at each discrete jacking screw position acts as a "fuse" which is arranged to fail (i.e break) under Fan Blade Off (FBO) loads so that the basic function of the trap door liner is unimpeded (ie the liner displaces outwards exposing the fan case fence to the released fan blade LE, arresting forward movement, facilitated by the collapse of the jacking screw through the liner.). Given the way the jacking screw behaves under FBO loads it may be referred to as a collapsible strut. Nevertheless, under normal operating conditions, such as fan blade rubbing and ice impacts, the strut must maintain clamping/jacking integrity to hold the the fan track liner panel in place.

The separator, in particular the separating leg, need not extend between the inner casing element and the outer casing radially with respect to the axis of the casing assembly. It may extend an angle thereto. Indeed, angling the separator, in particular the separating leg, may provide an advantage that a hard (but non fan blade-off) impact would allow the separating leg to act in a resilient manner (ie to spring back into position) rather than initiating a break in the frangible region of the inner casing element.

Each first casing element 102 is provided with at least one separator. Preferably, however, each first casing element 102 is provided with at least two separators, for example to be arranged generally circumferentially around the axis of the casing barrel with respect to each other.

Further retaining elements may be provided in a region of the inner casing element to prevent complete detachment of the inner casing element from the casing assembly. For example, the retaining elements may be provided at an axially rearward region of the inner casing element and mid axial span. The trapdoor (first casing element) is typically a feature in the forward portion of the first casing element, leaving at least 2 axial planes of retention, after an FBO event, away from the main impact zone where the first casing element may be largely destroyed. Radial displacement, movement, of the inner casing element may be a pivoting movement about the further retaining elements. The inner casing element may be considered a cantilever. The further retaining elements may be bolts, securing the inner casing element to another part of the casing assembly, for example to another part of the outer casing 104.

The invention claimed is:

1. A turbomachine casing assembly comprising:
   an inner casing element for arrangement radially outward of a turbomachine fan;
   an outer casing element for arrangement radially further outward of the turbomachine fan;
   a retaining lip arranged radially inward of at least a region of the inner casing element;

a separator located downstream of the retaining lip extending between the inner and outer casing elements, and the seperator arranged to urge a portion of the inner casing element against the lip;

wherein the separator is arranged to engage a frangible region of the inner casing element such that the frangible region is configured to break in preference to the separator.

2. The turbomachine casing assembly according to claim 1, wherein the separator is arranged in compression between the inner and outer casing elements to urge the portion of the inner casing element against the lip.

3. The turbomachine casing assembly according to claim 1, wherein the separator is arranged to engage the frangible region of the inner casing element such that the frangible region is configured to break in response to an impact satisfying predetermined conditions.

4. The turbomachine casing assembly according to claim 3, wherein breaking the frangible region allows the inner casing element to disengage from the lip and move towards the outer casing element.

5. The turbomachine casing assembly according to claim 4, wherein the separator is arranged to pass through the broken frangible region as the inner casing element moves towards the outer casing element.

6. The turbomachine casing assembly according claim 3, wherein in response to a fan blade-off event, the separator breaks the frangible region to allow the inner casing element to disengage from the lip and to move towards the outer casing element.

7. The turbomachine casing assembly according claim 3, wherein the frangible region of the inner casing element is configured to be structurally weaker than a surrounding region of the inner casing element to facilitate breaking of the frangible region in response to said impact.

8. The turbomachine casing assembly according to claim 3, wherein the separator includes:
    a separating leg arranged to extend between the inner and outer casing elements, and
    a clamping sub-assembly arranged to couple the separating leg to the frangible region of the inner casing element.

9. The turbomachine casing assembly according to claim 8, wherein the clamping sub-assembly includes a sleeve defining a passageway through the inner casing element, the separating leg extending at least partway along the passageway and being adapted for complementary locking engagement with the sleeve.

10. The turbomachine casing assembly according to claim 9, wherein an inner surface of the sleeve, at least partially defining the passageway, is threaded for complementary engagement with a threaded surface of the separating leg.

11. The turbomachine casing assembly according to claim 8, wherein the clamping sub-assembly is arranged to clamp, between mutually opposing flange elements, at least a portion of the inner casing element.

12. The turbomachine casing assembly according to claim 11, wherein a radially innermost flange of the mutually opposing flange elements is a collar provided integrally with the sleeve.

13. The turbomachine casing assembly according to claim 11, wherein a radially outermost flange of the mutually opposing flange elements is a body movable along an outer surface of the sleeve, adapted for complementary locking engagement with the sleeve to be capable of clamping a region of the inner casing element between itself and a radially innermost flange of the mutually opposing flange elements.

14. The turbomachine casing assembly according claim 11, wherein a radially outermost flange of the mutually opposing flange elements is a threaded nut for complementary engagement with a threaded outer surface of the sleeve.

15. The turbomachine casing assembly according to claim 8, wherein the clamping sub-assembly includes a breaking member, adapted to cause the breaking of the frangible region in response to said impact.

16. The turbomachine casing assembly according to claim 14, wherein the nut is configured to include one or more sharpened ridges engageable with the inner casing element.

17. The turbomachine casing assembly according to claim 8, wherein the separating leg extends at a non-radial angle relative to the axis of the casing assembly.

18. The turbomachine casing assembly according to claim 8, wherein the inner casing element is a fan track liner panel, and the clamping sub-assembly is arranged to clamp only a septum of the panel.

19. A turbomachine casing assembly according to claim 8, wherein the inner casing element is a fan track liner panel, and the clamping sub-assembly is arranged to clamp a portion of a tray liner holding a honeycomb structure and a septum of the panel.

20. A gas turbine engine comprising the turbomachine casing assembly according to claim 1.

* * * * *